(12) United States Patent
Lee et al.

(10) Patent No.: US 11,287,114 B2
(45) Date of Patent: Mar. 29, 2022

(54) LIGHTING DEVICE

(71) Applicant: LG INNOTEK CO., LTD., Seoul (KR)

(72) Inventors: Jung Ju Lee, Seoul (KR); Jae Hun Kim, Seoul (KR); Sang Jun Hong, Seoul (KR); Seong Wook So, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 490 days.

(21) Appl. No.: 16/330,821

(22) PCT Filed: Sep. 6, 2017

(86) PCT No.: PCT/KR2017/009776
§ 371 (c)(1),
(2) Date: Mar. 6, 2019

(87) PCT Pub. No.: WO2018/048201
PCT Pub. Date: Mar. 15, 2018

(65) Prior Publication Data
US 2021/0278063 A1 Sep. 9, 2021

(30) Foreign Application Priority Data

Sep. 9, 2016 (KR) .................. 10-2016-0116301
Sep. 21, 2016 (KR) .................. 10-2016-0121023
Oct. 4, 2016 (KR) .................. 10-2016-0127722

(51) Int. Cl.
*F21V 19/00* (2006.01)
*F21S 4/20* (2016.01)
(Continued)

(52) U.S. Cl.
CPC .............. *F21V 19/004* (2013.01); *B60Q 1/02* (2013.01); *B60R 16/03* (2013.01); *F21S 4/20* (2016.01);
(Continued)

(58) Field of Classification Search
CPC ...... F21V 19/004; F21V 19/0045; F21S 4/20; B60Q 1/263; B60Q 1/02; B60Q 1/0483
See application file for complete search history.

(56) References Cited

U.S. PATENT DOCUMENTS 10,030,836 B2 7/2018 Ah
10,408,425 B2 9/2019 Kim et al.
(Continued)

FOREIGN PATENT DOCUMENTS

CN 101737678 6/2010
CN 103765093 4/2014
(Continued)

OTHER PUBLICATIONS

Chinese Office Action dated Feb. 28, 2020 issued in Application No. 201780055720.X.
(Continued)

*Primary Examiner* — William N Harris
(74) *Attorney, Agent, or Firm* — Ked & Associates, LLP

(57) ABSTRACT

A lighting device may comprise: a flexible lighting module having a light emitting device; a coupling member arranged on the lower portion of the lighting module; and a bracket comprising a receiving groove in which the lighting module is received and having a coupling hole formed therein such that the coupling member is inserted and coupled thereto.

19 Claims, 15 Drawing Sheets

(51) Int. Cl.
*B60Q 1/02* (2006.01)
*B60R 16/03* (2006.01)
*F21Y 115/10* (2016.01)
*F21Y 107/70* (2016.01)

(52) U.S. Cl.
CPC ....... *F21Y 2107/70* (2016.08); *F21Y 2115/10* (2016.08)

(56) References Cited

U.S. PATENT DOCUMENTS

| | | | |
|---|---|---|---|
| 2005/0169002 A1* | 8/2005 | Steen | F21S 43/237 362/487 |
| 2007/0070651 A1* | 3/2007 | Azuma | F21V 19/009 362/655 |
| 2010/0110703 A1* | 5/2010 | Chiang | F21V 19/004 362/382 |
| 2010/0118514 A1 | 5/2010 | Cho et al. | |
| 2011/0038147 A1* | 2/2011 | Lin | F21V 19/004 362/235 |
| 2015/0226384 A1 | 8/2015 | Park | |
| 2018/0112836 A1* | 4/2018 | Rieder | F21K 9/272 |

FOREIGN PATENT DOCUMENTS

| | | |
|---|---|---|
| CN | 104662364 | 5/2015 |
| CN | 205480658 | 8/2016 |
| IT | VE20 110 058 | 2/2013 |
| KR | 20-1998-0041616 | 9/1998 |
| KR | 20-0336658 | 12/2003 |
| KR | 2005-347280 | 12/2005 |
| KR | 20-0423202 | 7/2006 |
| KR | 10-2007-0095065 | 9/2007 |
| KR | 10-2010-0054596 | 5/2010 |
| KR | 2010-262781 | 11/2010 |
| KR | 10-1351358 | 1/2014 |
| KR | 10-2015-0115425 | 10/2015 |
| KR | 10-1655740 | 9/2016 |

OTHER PUBLICATIONS

European Search Report dated Jul. 22, 2020 issued in Application No. 17849085.0.
International Search Report (with English Translation) and Written Opinion dated Jan. 12, 2018 issued in Application No. PCT/KR2017/009776.

\* cited by examiner

LIGHTING DEVICE

CROSS-REFERENCE TO RELATED PATENT APPLICATIONS

This application is a U.S. National Stage Application under 35 U.S.C. § 371 of PCT Application No. PCT/KR2017/009776, filed Sep. 6, 2017, which claims priority to Korean Patent Application No. 10-2016-0116301, filed Sep. 9, 2016; Korean Patent Application No. 10-2016-0121023, filed Sep. 21, 2016; and Korean Patent Application No. 10-2016-0127722, filed Oct. 4, 2016, whose entire disclosures are hereby incorporated by reference.

TECHNICAL FIELD

Embodiments relate to a lighting device for improving assemblability of a light source.

BACKGROUND ART

In recent years, a lighting market using light emitting device has been rapidly emerging, and these lighting is being used not only for displays and backlights for signs but also for vehicle lighting.

Light emitting device, for example, light emitting diode (LED) has advantages such as low power consumption, a semi-permanent life cycle, a fast response time, safety, and environment friendly when compared to the existing light sources such as fluorescent lamps and incandescent bulbs. Particularly, lamps adopting the LED as the vehicle lighting are advantageous in that a high output is possible, and the power consumption is less when compared to other light sources.

In the lighting device for the vehicle, an LED lighting module is coupled to a front or rear surface of the vehicle. Although the LED lighting module is usually coupled to the vehicle by using an adhesive, adhesion force of the LED lighting module may be reduced to cause defects such as separation of the LED lighting module.

DISCLOSURE OF THE INVENTION

Technical Problem

Embodiments provide a lighting device for preventing an LED lighting module from being separated from a vehicle.

Technical Solution

A lighting device according to an embodiment includes a flexible lighting module provided with a light emitting device, a coupling member disposed on a lower portion of the lighting module, and a bracket including a receiving groove configured to receive the lighting module and formed with a coupling hole into which the coupling member is inserted and coupled.

The coupling member may include a body part disposed on the lower portion of the lighting module, a protrusion part protruding to a lower portion of the body part, and first and second hook parts bent upward from an end of the protrusion part and disposed to face each other, wherein the first and second hook parts may support a lower portion of the bracket.

The coupling member may be disposed on the lower portion of the lighting module corresponding to the light emitting device and may include a metal material.

The lighting module may include a shape that is partially bent in an up, down, left and right directions.

A lighting device according to another embodiment includes a lighting module provided with a light emitting device, a connector disposed on a lower portion of the lighting module and connected to an external power source to supply power to the light emitting device, and a bracket including a recess which receives the lighting module and through which the connector passes, wherein the lighting module may be slid in a first direction and is coupled to the bracket, and a hook part protruding in the first direction may be disposed on one side of the connector.

The lighting module may be slid in a state in which one side of the bracket is inserted therein, and the hook part may have tension.

The bracket may further include a receiving part receiving the hook part, wherein the receiving part may include a first support part surrounding a side surface of the hook part and a second support part surrounding a lower portion of the hook part.

The bracket may include a base plate and sidewalls respectively connected to both sides of the base plate, the hook part is disposed on an outer surface of the at least one sidewall, and a fixing member including a bending part and a fixing part and a support part, which are respectively connected to both sides of the bending part, is further provided on one side of the bracket, wherein the fixing part and the support part of the fixing member may be inserted into the sidewall, and a coupling groove may be formed in the fixing part and fixed to the hook part.

The hook part may be inclined in a direction in which the fixing member is inserted. The support part may include a bent potion.

Advantageous Effects

According to the embodiment, a hook type coupling member may be provided to stably couple the lighting module to the bracket while effectively maintaining a shape of a substrate that is partially bent.

Also, the embodiment has an effect of preventing the occurrence of a dark portion due to the hook protrusion by removing the hook protrusion covering a portion of the lighting module.

Also, the embodiment has an effect a damage of the light emitting device due to the bending of the substrate may be prevented by disposing the coupling member at the lower portion of the light emitting device.

Also, according to the embodiment, the coupling member may be formed of the metal material to effectively release the heat generated from the light emitting device.

Also, according to the embodiment, the coupling member may effectively support the lower portion of the light emitting device when the flexible substrate is bent to prevent the light emitting device from being damaged.

Also, according to the embodiment, the hook part coupled to the bracket may be provided on one side of the connector to prevent the lighting module from being separated from the bracket by the pressure generated when the connector is coupled to the external power source.

Also, according to the embodiment, the receiving part for receiving the hook part may be further provided to more stably fix the lighting module to the bracket.

Also, according to the embodiment, the receiving part may prevent the hook part from moving in the direction of the side surfaces to stably align the lighting module to the bracket.

Also, according to the embodiment, the hook part and the connector may be separately provided to prevent the connector from being damaged while the lighting module is coupled to the bracket.

According the embodiment, the light may leak through the sidewall of the lighting module to minimize the light loss, thereby maximizing the light efficiency.

Also, the assemblability of the lighting module may be improved by using a separate coupling device of the lighting module, and the separation of the lighting module due to the lifting phenomenon and vibration may be prevented from occurring.

MODE FOR CARRYING OUT THE INVENTION

Figure 1:
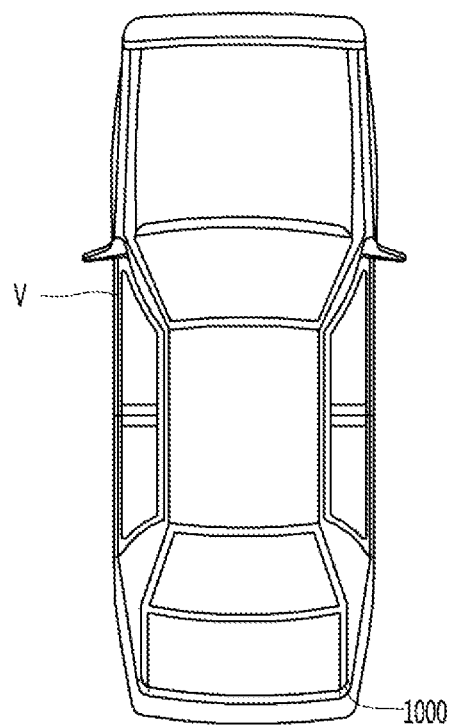
FIG. 1 is a plan view of a vehicle provided with a lighting device according to an embodiment.

Hereinafter, preferred embodiments of the present invention will be described in detail with reference to the accompanying drawings in such a manner that the technical idea of the present invention may easily be carried out by a person with ordinary skill in the art to which the invention pertains. However, the embodiments disclosed in this specification and the constructions illustrated in the drawings are only preferred embodiments of the present invention. Accordingly, it should be understood that various equivalents and modifications which can substitute the embodiments may be provided at an application time point of this specification.

In the following description of the present invention, a detailed description of known functions and configurations incorporated herein will be omitted when it may make the subject matter of the present invention rather unclear. The following terms are defined in consideration of the functions of the present invention, and the meaning of each term should be interpreted based on the contents throughout this specification. The same reference numerals are used for portions having similar functions and functions throughout the drawings.

A lighting device according to the present invention may be applied to various lamp devices requiring lightings, for example, vehicle lamps, domestic lighting devices, and industrial lighting devices. For example, when applied to the vehicle lamps, the lighting device may be applied to a head lamp, a sidelight, a side mirror light, a fog lamp, a tail lamp, a brake lamp, a sidelight, a daytime running light, a vehicle interior light, a door scar, a rear combination lamp, and a backup lamp. The lighting device of the present invention may be applied to fields of indoor and outdoor advertisement devices, and it may be applied to all lighting-related fields or advertising-related fields that are currently developed and commercialized or can be implemented according to future technology development.

Hereinafter, the embodiments will become more apparent from the accompanying drawings and descriptions of the embodiments. In the description of the embodiments, it will be understood that when a layer (or film), region, pattern or structure is referred to as being cony or 'under' another layer (or film), region, pad or pattern, the terminology of cony and 'under' includes both the meanings of 'directly' and 'indirectly'. Further, the reference about cony and 'under' each layer will be described on the basis of drawings.

Figure 2:
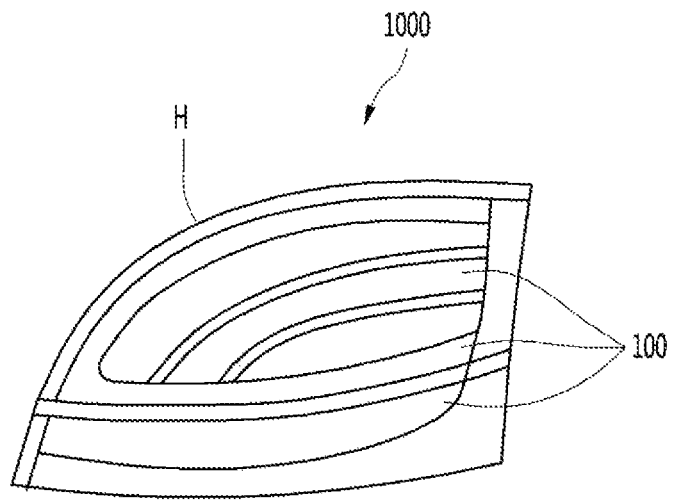
FIG. 2 is a view of the lighting device for the vehicle according to an embodiment.

FIG. 1 is a plan view of a vehicle provided with a lighting device according to an embodiment, and FIG. 2 is a view of the lighting device for the vehicle according to an embodiment.

Referring to FIGS. 1 and 2, a lighting device 1000 according to an embodiment may be disposed on a rear lamp of a vehicle V. The rear lamp of the vehicle V may include a plurality of lighting devices 1000. Each of the plurality of lighting devices 1000 may be a light source serving as a turn signal lamp, a sidelight, or a brake lamp.

The lighting device 1000 may include a lighting module 100 and a housing H receiving the lighting module 100. Here, the lighting device 1000 may further include a bracket for coupling the lighting module 100 to a rear side of the vehicle.

The housing H may be formed of a light transmissive material. The housing H may be curved according to a design of a body of the vehicle V, and the lighting module 100 may realize a surface light source having a curved surface according to the shape of the housing H. Although the housing H is provided as one unit in this embodiment, the housing may include an outer lens, an inner lens, and a bezel.

In the safety standard of the lighting device of the vehicle V, when light is measured with reference to front light, a light distribution standard of a tail lamp is in the range of 4 cd to 5 cd, and a light distribution standard of the brake lamp is the range of 60 cd to 80 cd. The lighting module 100 according to an embodiment may be configured to distribute light having a luminous intensity with a candela of more than the vehicle safety standard so as to provide a luminous intensity within the vehicle safety standard of the lamp such as the brake lamp or the tail lamp.

Although the lighting device is applied to the tail lamp of the vehicle in this embodiment, the present invention is not limited thereto. For example, the lighting device may be applied to a headlight of the vehicle.

Figure 3:
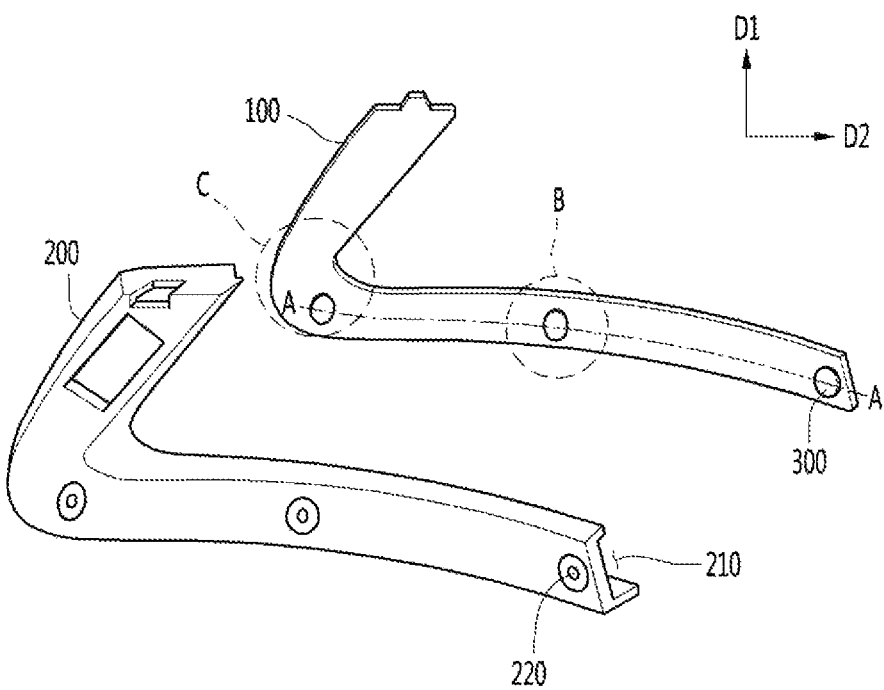
FIG. 3 is a perspective view of a lighting device according to a first embodiment.
Figure 4:
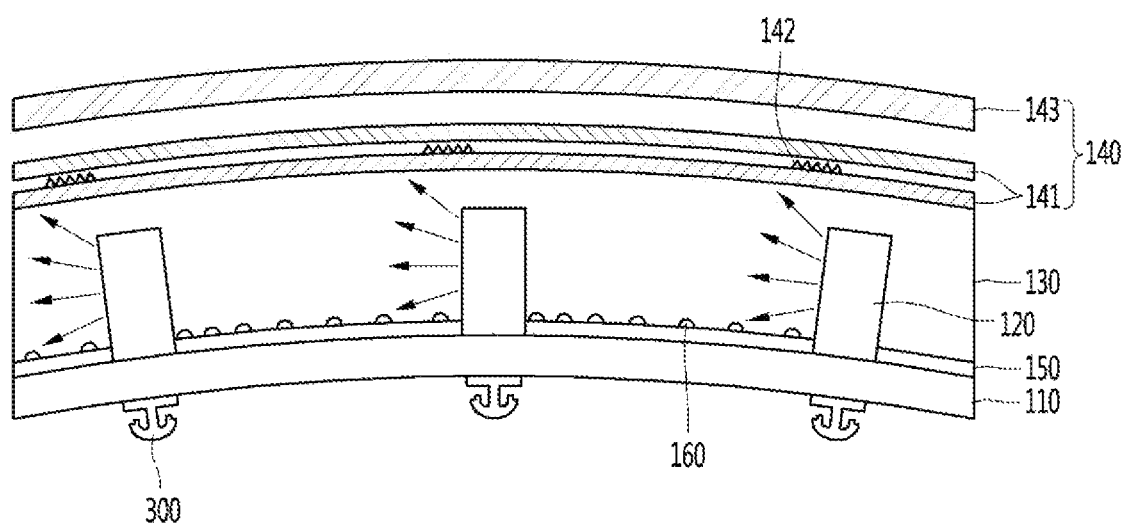
FIG. 4 is a cross-sectional view taken along line A-A of FIG. 3.
Figure 5:
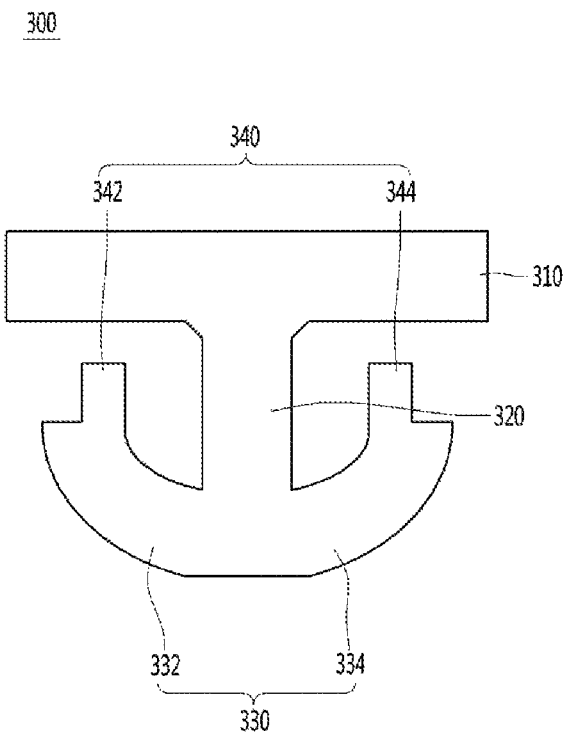
FIG. 5 is a cross-sectional view of a coupling part provided in a lighting module according to the first embodiment.
Figure 6:
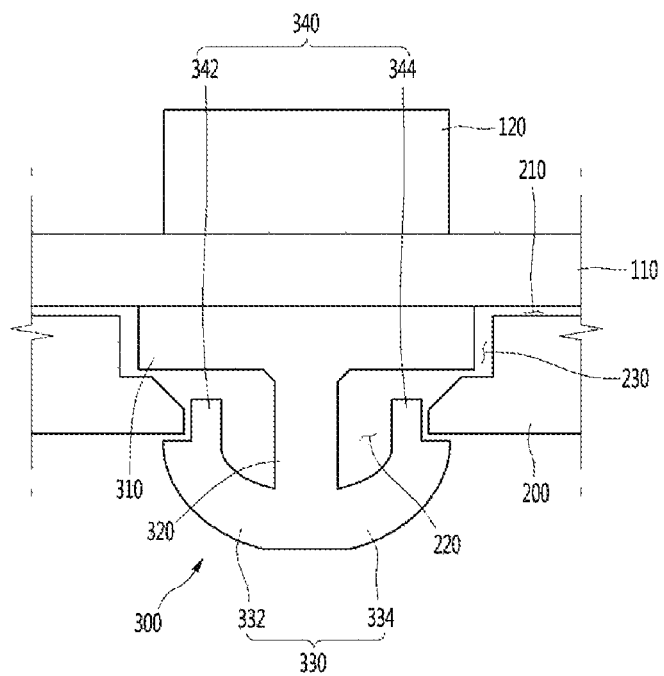
FIG. 6 is a cross-sectional view illustrating a state in which the lighting module and a bracket are coupled to each other according to the first embodiment.

FIG. 3 is a perspective view of a lighting device according to a first embodiment, FIG. 4 is a cross-sectional view taken along line A-A of FIG. 3, FIG. 5 is a cross-sectional view of a coupling part provided in a lighting module according to the first embodiment, and FIG. 6 is a cross-sectional view illustrating a state in which the lighting module and a bracket are coupled to each other according to the first embodiment.

Referring to FIG. 3, a lighting device 1000 according to a first embodiment may include a lighting module 100 and a bracket 200 accommodating the lighting module 100.

The lighting module 100 may include a first region B of which a portion of the lighting module 100 is bent in a first direction D1. The lighting module 100 may include a second region C of which a portion of the lighting module 100 is bent in a second direction D2. For example, the lighting module 100 may have a shape that is bent in a shape. Here, the first direction D1 may be a vertical direction, and the second direction D2 may be a horizontal direction.

The bracket 200 may have a shape corresponding to that of the lighting module 100. The bracket 200 may be formed of a plastic material. A receiving groove 210 receiving the lighting module 100 may be formed to an upper portion of the bracket 200.

The lighting module 100 may be coupled to the bracket 200 through a hook type coupling member 300. For this, a coupling hole 220 may be formed to the bracket 200. A structure in which the lighting module 100 is coupled to the bracket 200 will be described below in detail.

As illustrated in FIG. 4, the lighting module 100 may include a substrate 110, a plurality of light emitting devices 120 on the substrate 100, a light guide member 130 surrounding the light emitting devices 120, and an optical member 140 disposed on the light guide member 130. Here, a reflection member 150 may be further disposed on the substrate 110 in a peripheral region of the light emitting device 120.

The substrate 110 may have a long bar shape that extends in one direction. The substrate 110 may be formed of a flexible material. The substrate 110 may include a resin-based printed circuit board (PCB), a metal core PCB, a flexible PCB, a ceramic PCB, a FR-4 substrate, and the like. When the substrate 110 is provided as the metal core PCB in which a metal is disposed on a bottom surface thereof, the light emitting device 120 may be improved in heat dissipation efficiency.

The light emitting devices 120 may be disposed to be spaced apart from each other in a longitudinal direction of the substrate 110. The light emitting devices 120 may be disposed in one column or two columns or more on the substrate 110 in the longitudinal direction. The light emitting device 120 may be a device including a light emitting diode and may include a package in which an LED chip is packaged. The LED chip may emit at least one of blue, red, and green light and ultraviolet (UV) light. The light emitting device 120 may emit at least one of white, blue, red, and green light. The light emitting device 120 may be a side view type in which a bottom portion is electrically connected to the substrate 110, but is not limited thereto.

The light guide member 130 may be laminated with a structure for embedding the light emitting device 120. The light guide member 130 may be closely attached to the light guide member 130 on an outer surface of a semiconductor device.

The light guide member 130 may include a resin layer. The resin layer may be formed of a high heat-resistant ultraviolet curable resin including an oligomer. Urethane acrylate may be used as the ultraviolet curable resin, but is not limited thereto. For example, at least one of epoxy acrylate, polyester acrylate, polyether acrylate, polybutadiene acrylate, and silicone acrylate may be used as the ultraviolet curable resin.

Particularly, when urethane acrylate is used as oligomer, two types of urethane acrylate are mixed with each other, different physical properties may be realized at the same time.

The resin layer may further include at least one of a monomer and a photo initiator. Also, the resin layer may be formed of a thermosetting resin having high heat resistance. Particularly, the resin layer may be formed of a thermosetting resin including at least one of a polyester polyol resin, an acrylic polyol resin, and a hydrocarbon-based or/and ester-based solvent. The thermosetting resin may further include a thermosetting agent for improving film strength.

The optical member 140 may include a first optical member 141 and a second optical member 143. The first optical member 141 serves to disperse concentration of light. The first optical member 141 may include a plurality of optical films. A light blocking pattern 142 may be disposed on one surface of the first optical member 141. The light blocking pattern 142 may be disposed on a light emission surface of the light emitting device 120. The first optical member 141 may include polyester (PET), and titanium dioxide ($TiO_2$).

The second optical member 143 may be disposed to be spaced a predetermined distance from the first optical member 141. The spaced distance between the second optical member 143 and the first optical member 141 may improve light uniformity through a dispersion distance of light. The spaced distance between the second optical member 143 and the first optical member 141 may be 5 mm to 7 mm. The second optical member 143 may serve to diffuse light. The second optical member 143 may include polycarbonate (PC).

The optical member 140 may improve the light uniformity and also realize the uniform surface emission.

The reflection member 150 may be disposed on the substrate 110 except for a region on which the light emitting device 120 is disposed. The reflection member may have a film shape. The reflection member 150 may include a foam resin having a white color. The reflection member 150 may reflect light to improve the uniformity. A reflection pattern 160 may be further disposed on the reflection member 150.

The reflection pattern 160 may scatter and disperse incident light to uniformly transmit the light upward. A distance between the reflection pattern 160 and the light emitting device 120 may be reduced in a direction in which the reflection pattern is away from the light emitting device 120. The reflection pattern 160 may be formed by printing reflection ink including one of $TiO_2$, $CaCo_3$, $BaSO_4$, $Al_2O_3$, silicon, and PS on a surface of the reflection member 160, but is not limited thereto.

A coupling member 300 according to an embodiment may be further disposed on a lower portion of the lighting module 100. The coupling member 300 may be disposed on a lower portion of the substrate 110 that vertically overlaps the light emitting device 120. The coupling member 300 may be disposed on the region overlapping the light emitting device 120 to effectively release heat generated from the light emitting device 120. For this, the coupling member 300 may be formed of a metal material.

Also, the coupling member 300 may effectively support the lower portion of the light emitting device 120 when the flexible lighting module 100 is bent to prevent the light emitting device 120 from being damaged.

As illustrated in FIG. 5, the coupling member 300 according to the first embodiment may include a body part 310, a protrusion part 320 protruding downward from the body part 310, a hook part 330 disposed to face the protrusion part 320 and bent upward, and a support part 340 protruding upward from the hook part 330.

The body part 310 may have a circular plate shape. The shape of the body part 310 is not limited to the above-described shape. For example, the body part 310 may have various shapes such as a polygonal shape, a hemispherical shape, and the like. The body part 310 may be formed of a metal material. The protrusion part 320 may protrude toward a lower portion of the body part 310.

The hook part 330 may include a first hook part 332 and a second hook part 334. The first hook part 332 may be bent upward from an end of the protrusion part 320. An outer surface of the first hook part 332 may have a curved surface. The first hook part 332 may have tension. The second hook part 334 may be disposed to face the first hook part 332. The second hook part 334 may have the same structure as the first hook part 332.

A support part 340 may be further disposed on an upper portion of the hook part 330. The support part 340 may have a polygonal shape, but is not limited thereto. The support part 340 may include a first support part 342 and a second support part 344. The first support part 342 may be disposed on an upper portion of the first hook part 332. The first support part 342 may protrude upward from a portion of the upper portion of the first hook part 332. An inner surface of the first support part 342 may have a structure that extends from an inner surface of the first hook part 332. The second support part 344 may be disposed on an upper portion of the second hook part 334. The second support part 344 may have the same structure as the first support part 342.

The body part 310 may have the same width as the light emitting device or may have a width greater than that of the light emitting device 120. Thus, the body part 310 may prevent the light emitting device 120 from being bent and effectively absorb the heat generated from the light emitting device.

Also, the body part 310 may have a width greater than that of each of the protrusion part 320 and the hook part 330. Thus, the body part 310 may prevent coupling force between the hook part 330 and the bracket 200 from being reduced.

As illustrated in FIG. 6, the coupling member 300 may be inserted into a coupling hole formed to the bracket 200 and may be coupled to the bracket 200. Here, since each of the first hook part 332 and the second hook part 334 has tension, the first hook part 332 and the second hook part 334 may be bent toward the protrusion part 320 while the coupling member 300 is inserted into the coupling hole 220 formed to the bracket 200.

An inner surface of the bracket 200 to which the coupling hole 220 is formed may include a protrusion structure of which a portion protrudes inward. A portion of an inner surface of the protrusion structure may be inclined so that the coupling member 300 is effectively coupled to the bracket.

When the coupling member 300 is completely inserted into the coupling hole 220 formed to the bracket 200, each of the first hook part 332 and the second hook part 334 returns to its original shape, and the bracket 200 is disposed between the upper portion of the first hook part 332 and a side surface of the first support part 342. The first hook part 332 may support a portion of a lower portion of the bracket 200 to which the coupling hole 220 is formed, and the first support part 342 may support a portion of the side surface of the bracket 200 to which the coupling hole 220 is formed.

A settling groove 230 into which the body part 310 of the coupling member 300 is inserted may be further formed to the bracket 200. The settling groove 230 may support a portion of the side surface and the lower portion of the body part 310. A distance between the substrate 110 and the bracket 200 may be minimized by the settling groove 230 formed to the bracket 200 so that the substrate 110 is stably settled on the bracket 200.

The coupling member according to an embodiment may be provided in plurality, which are spaced apart from each other, on the lower portion of the substrate so as to be stably coupled to the bracket while effectively maintaining the shape of the substrate, which is partially bent.

Also, the embodiment has an effect of preventing the occurrence of the dark portion by removing the hook protrusion covering a portion of the lighting module, thereby improving the quality of the product.

Figure 7:
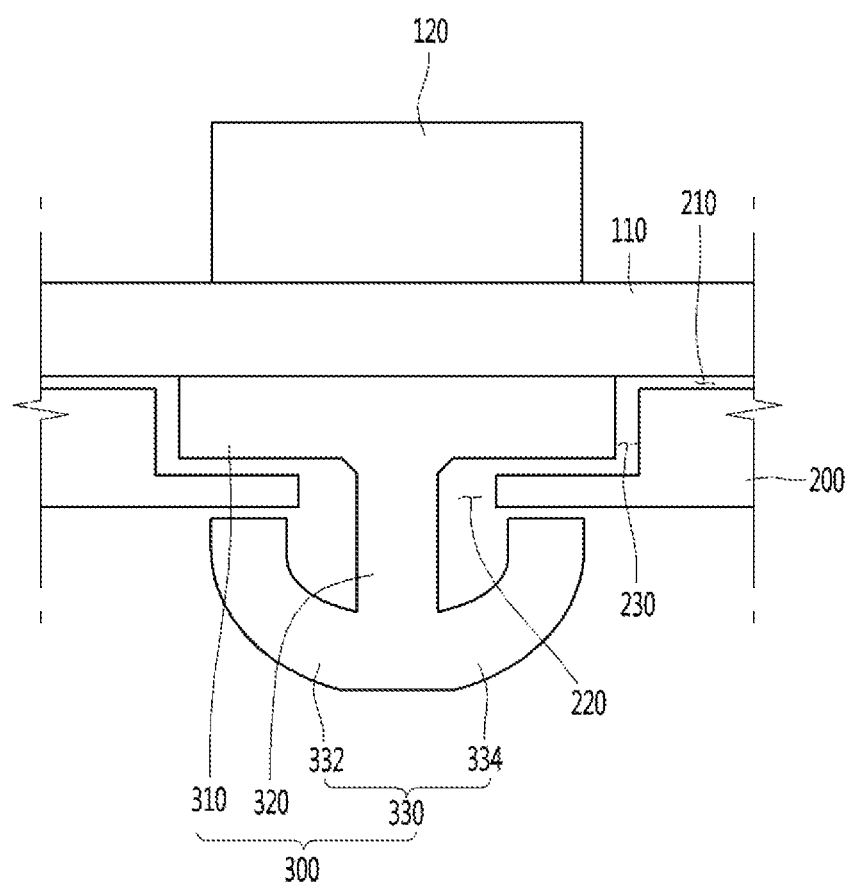
FIGS. 7 to 9 are cross-sectional views illustrating a modified example of the state in which the lighting module and the bracket are coupled to each other according to the first embodiment.
Figure 8:
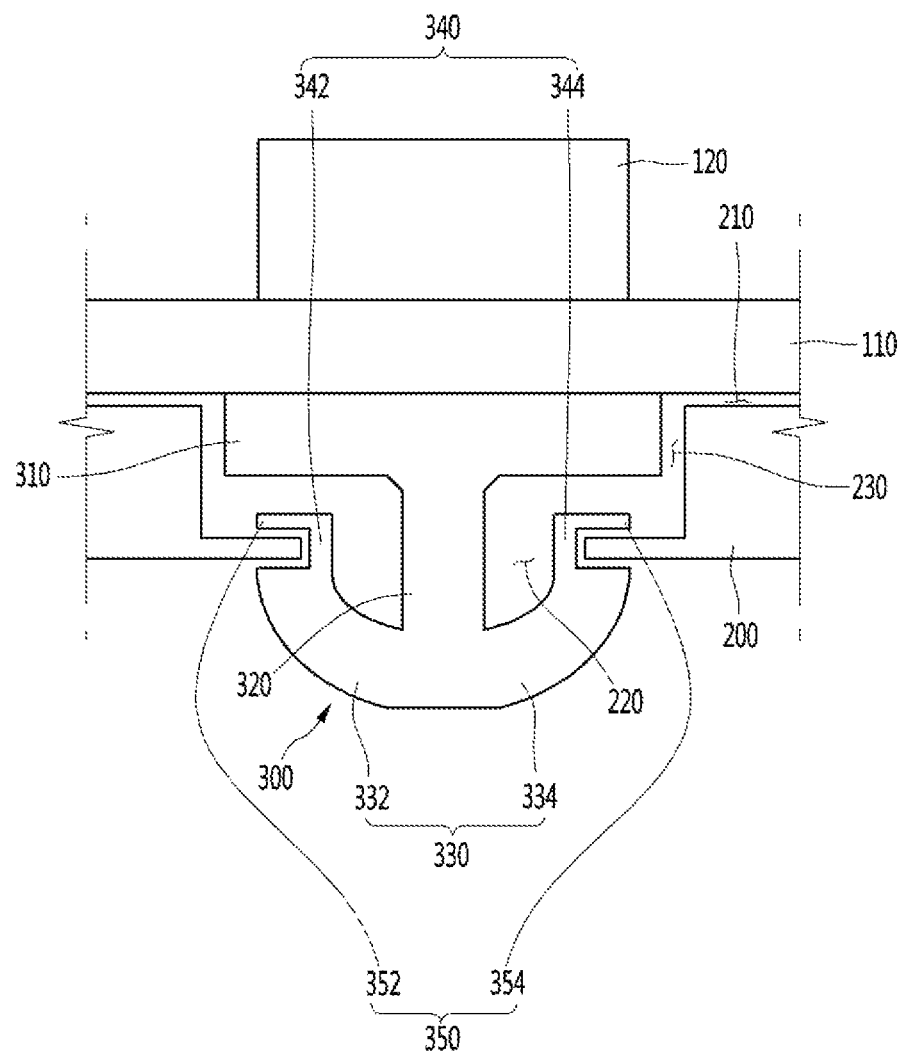
Figure 9:
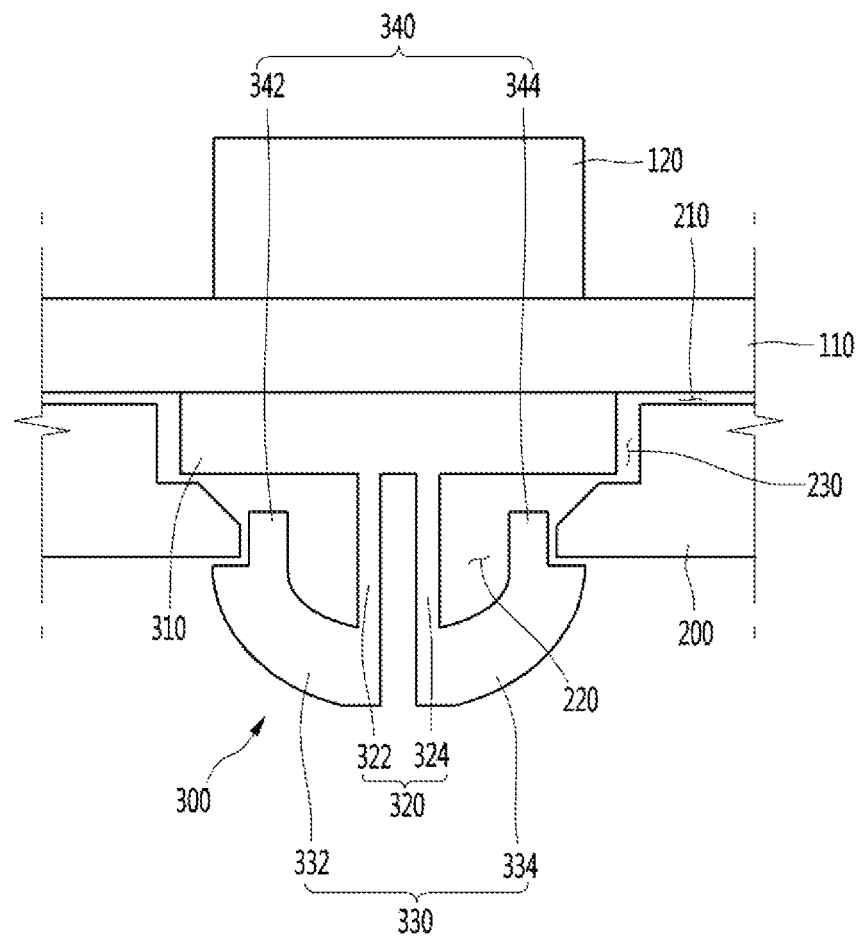

FIGS. 7 to 9 are cross-sectional views illustrating a modified example of the state in which the lighting module and the bracket are coupled to each other according to the first embodiment.

As illustrated in FIG. 7, the coupling member 300 may include a body part 310, a protrusion part 320 protruding downward from the body part 310, and a hook part 330 disposed to face the protrusion part 320 and bent upward. Here, the coupling part is the same as the coupling part according to the first embodiment except that the support part is removed from the coupling part, and thus, its detailed description will be omitted.

The coupling member 300 may be inserted into a coupling hole 220 formed to a bracket 200 and coupled to the bracket 200. Here, since each of a first hook part 332 and a second hook part 334 has tension, the first hook part 332 and the second hook part 334 may be bent toward the protrusion part 320 while the coupling member 300 is inserted into the coupling hole 220 formed to the bracket 200.

When the coupling member 300 is completely inserted into the coupling hole 220 formed to the bracket 200, each of the first hook part 332 and the second hook part 334 returns to its original shape, and the bracket 200 is disposed on an upper portion of the first hook part 332. The first hook part 332 supports a portion of a lower portion of the bracket 200 to which the coupling hole 220 is formed.

A settling groove 230 into which the body part 310 of the coupling member 300 is inserted may be further formed to the bracket 200. The settling groove 230 may support a portion of the side surface and the lower portion of the body part 310. A distance between the substrate 110 and the bracket 200 may be minimized by the settling groove 230 formed to the bracket 200 so that the substrate 110 is stably settled on the bracket 200.

The lighting module according to an embodiment may be coupled to the bracket by simplifying a configuration of the coupling member to reduce manufacturing costs of the coupling member.

As illustrated in FIG. 8, the coupling member 300 may include a body part 310, a protrusion part 320 protruding downward from the body part 310, a hook part 330 disposed to face the protrusion part 320 and bent upward, a support part 340 protruding upward from the hook part 330, and a horizontal part 350 protruding from the support part 340 toward the outside of the protrusion part 320. Here, the coupling member is the same as the coupling member according to the first embodiment except for the horizontal part 350, and thus, its detailed description will be omitted.

The horizontal part 350 may include a first horizontal part 352 and a second horizontal part 354. The first horizontal part 352 may extend from an upper portion of the first support part 342 toward the outside of the protrusion part 320. The first horizontal part 342 may be parallel to a top surface of the first hook part 332. Thus, the first support part 342 may connect the first horizontal part 352 to the first hook part 332, and a predetermined groove may be formed between the first hook part 332 and the first horizontal part 352. The second horizontal part 354 may have the same structure as the first horizontal part 352.

When the coupling member 300 is completely inserted into the coupling hole 220 formed to the bracket 200, each of the first hook part 332 and the second hook part 334 returns to its original shape, and the bracket 200 may be disposed in the predetermined groove formed between the first hook part 32 and the first horizontal part 352. The first hook part 332 supports a portion of an upper portion of the bracket 200 to which the coupling hole 220 is formed. The first support part 342 supports a side surface of the bracket 200 to which the coupling hole 220 is formed. The first horizontal part 352 supports a portion of the upper portion of the bracket 200 to which the coupling hole 220 is formed.

The coupling member according to an embodiment may include the horizontal part supporting the portion of the upper portion of the bracket to more improve the coupling force with respect to the bracket.

As illustrated in FIG. 9, the coupling member 300 may include a body part 310, a protrusion part 320 protruding downward from the body part 310, a hook part 330 disposed to face the protrusion part 320 so as to be bent upward, and a support part 340 protruding upward from the hook part 330. Here, the coupling member is the same as the coupling member according to the first embodiment except for the protrusion part 320, and thus, its detailed description will be omitted.

The protrusion part 320 may include a first protrusion part 322 and a second protrusion part 324. The first protrusion part 322 may protrude toward a lower portion of the body part 310. The second protrusion part 324 may be disposed to be spaced apart from the first protrusion part 322. Each of the first protrusion part 322 and the second protrusion part 324 may have tension.

The first hook part 332 may be bent upward from the first protrusion part 322. The first hook part 332 may not have tension. The second hook part 334 may be bent upward from the second protrusion part 324. The first hook part 332 and the second hook part 334 may be disposed to face each other.

When the coupling member 300 is completely inserted into the coupling hole 220 formed to the bracket 200, each of the first protrusion part 322 and the second protrusion part 324, which are pressed by the first hook part 332 and the second hook part 334, may return to its original shape. The bracket 200 is disposed between the upper portion of the first hook part 332 and the side surface of the first support part 342. The first hook part 332 may support a portion of a lower portion of the bracket 200 to which the coupling hole 220 is formed, and the first support part 342 may support a portion of the side surface of the bracket 200 to which the coupling hole 220 is formed.

The coupling member according to an embodiment may include the plurality of protrusion parts, each of which has tension, to more improve the coupling force between the substrate and the bracket.

Figure 10:
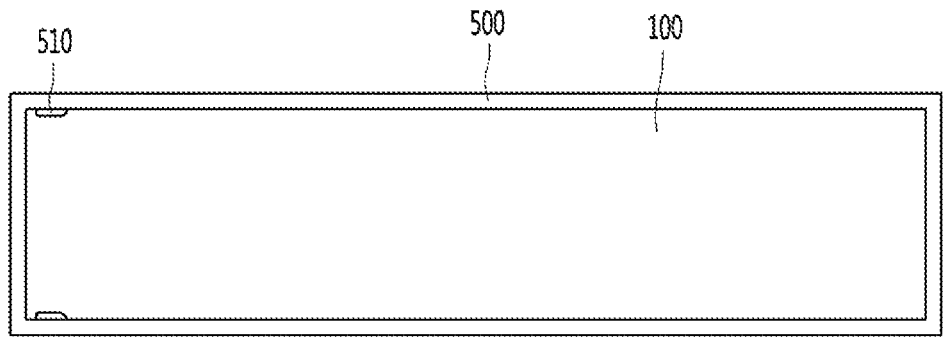
FIG. 10 is a plan view of a lighting device according to a second embodiment.
Figure 11:
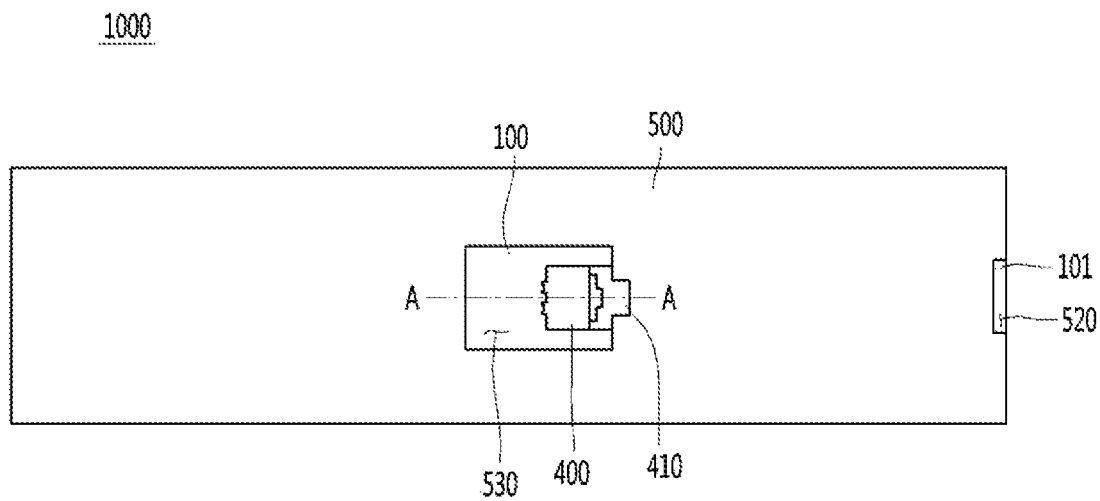
FIG. 11 is a rear view of the lighting device according to the second embodiment.
Figure 12:
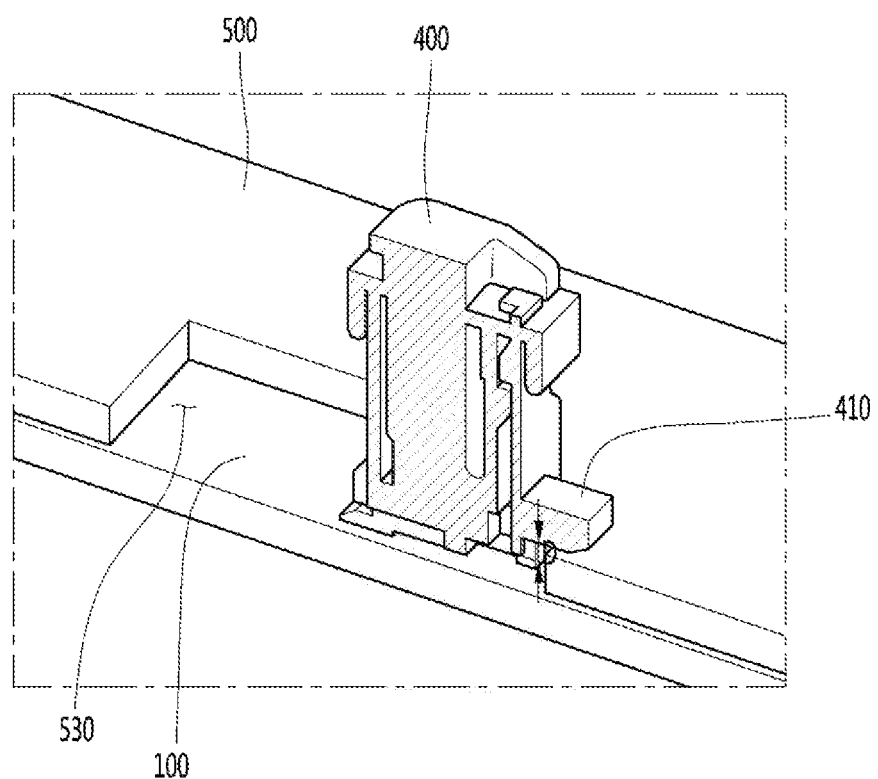
FIG. 12 is a cross-sectional view taken along line A-A of FIG. 11.
Figure 13:
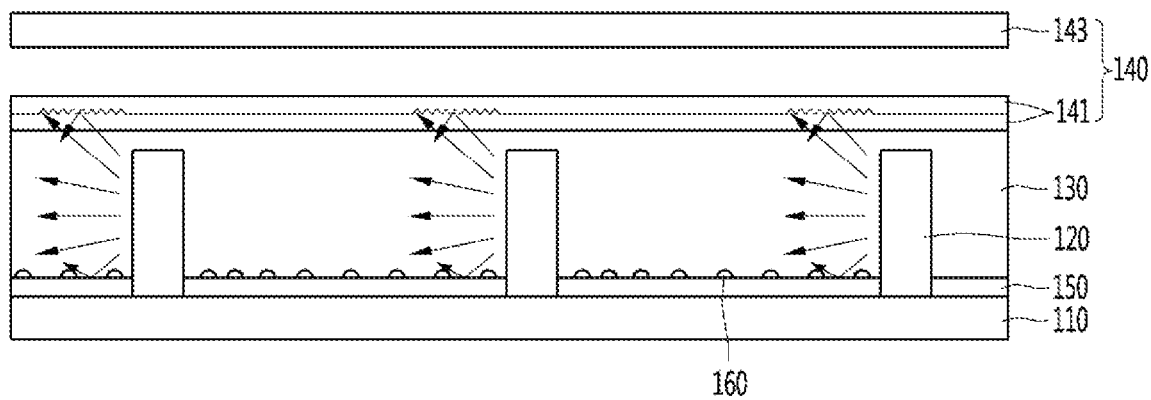
FIG. 13 is a cross-sectional view of a lighting module provided in the lighting device according to the second embodiment.

FIG. 10 is a plan view of a lighting device according to a second embodiment, FIG. 11 is a rear view of the lighting device according to the second embodiment, FIG. 12 is a cross-sectional view taken along line A-A of FIG. 11, and FIG. 13 is a cross-sectional view of a lighting module provided in the lighting device according to the second embodiment.

Referring to FIGS. 10 and 11, a lighting device 1000 according to a second embodiment may include a lighting module 100 and a bracket 500 receiving the lighting module 100.

The lighting module 100 may have a bar shape that lengthily extends in one direction. The lighting module may be formed of a flexible material. The lighting module 100 may be vertically bent or horizontally bent so as to be mounted on a vehicle.

A coupling part 101 may be disposed on one side of the lighting module 100. The coupling part 101 may stably fix one side of the lighting module 100 to the bracket 500. For this, the coupling part 101 may protrude from one side of the lighting module 100. The coupling part 101 may have a polygonal shape, but is not limited thereto.

The lighting module 100 may serve as a surface light source. The lighting module 100 may include a plurality of light emitting devices.

As illustrated in FIG. 13, the lighting module 100 may include a substrate 110, a plurality of light emitting devices 120 on the substrate 110, a light guide member 130 surrounding the light emitting devices 120, and an optical member 140 disposed on the light guide member 130. Here, a reflection member 150 may be further disposed on the substrate 110 in a peripheral region of the light emitting device 120.

The substrate 110 may have a long bar shape that extends in one direction. The substrate 110 may be formed of a flexible material. The substrate 110 may include a resin-based printed circuit board (PCB), a metal core PCB, a flexible PCB, a ceramic PCB, a FR-4 substrate, and the like. When the substrate 110 is provided as the metal core PCB in which a metal is disposed on a bottom surface thereof, the light emitting device 120 may be improved in heat dissipation efficiency.

The light emitting devices 120 may be disposed to be spaced apart from each other in a longitudinal direction of the substrate 110. The light emitting devices 120 may be disposed in one column or two columns or more on the substrate 110 in the longitudinal direction. The light emitting device 120 may be a device including a light emitting diode and may include a package in which an LED chip is packaged. The LED chip may emit at least one of blue, red, and green light and ultraviolet rays (UV). The light emitting device 120 may emit at least one of white, blue, red, and green light. The light emitting device 120 may be a side view type in which a bottom portion is electrically connected to the substrate 110, but is not limited thereto.

The light guide member 130 may be laminated with a structure for embedding the light emitting device 120. The light guide member 130 may be closely attached to the light guide member 130 on an outer surface of a semiconductor device.

The light guide member 130 may include a resin layer. The resin layer may be formed of a high heat-resistant ultraviolet curable resin including an oligomer. Urethane acrylate may be used as the ultraviolet curable resin, but is not limited thereto. For example, at least one of epoxy acrylate, polyester acrylate, polyether acrylate, polybutadiene acrylate, and silicone acrylate may be used as the ultraviolet curable resin.

Particularly, when urethane acrylate is used as oligomer, two types of urethane acrylate are mixed with each other, different physical properties may be realized at the same time.

The resin layer may further include at least one of a monomer and a photo initiator. Also, the resin layer may be formed of a thermosetting resin having high heat resistance. Particularly, the resin layer may be formed of a thermosetting resin including at least one of a polyester polyol resin, an acrylic polyol resin, and a hydrocarbon-based or/and ester-based solvent. The thermosetting resin may further include a thermosetting agent for improving film strength.

The optical member 140 may include a first optical member 141 and a second optical member 143. The first optical member 141 serves to disperse concentration of light. The first optical member 141 may include a plurality of optical films. A light blocking pattern may be disposed on one surface of the first optical member 141. The light blocking pattern may be disposed on a light emission surface of the light emitting device 120. The first optical member 141 may include polyester (PET), and titanium dioxide ($TiO_2$).

The second optical member 143 may be disposed to be spaced a predetermined distance from the first optical member 141. The spaced distance between the second optical member 143 and the first optical member 141 may improve light uniformity through a dispersion distance of light. The spaced distance between the second optical member 143 and the first optical member 141 may be 5 mm to 7 mm. The second optical member 143 may serve to diffuse light. The second optical member 143 may include polycarbonate (PC).

The optical member 140 may improve the light uniformity and also realize the uniform surface emission.

The reflection member 150 may be disposed on the substrate 110 except for a region on which the light emitting device 120 is disposed. The reflection member may have a film shape. The reflection member 150 may include a foam resin having a white color. The reflection member 150 may reflect light to improve the uniformity. A reflection pattern 160 may be further disposed on the reflection member 150.

The reflection pattern 160 may scatter and disperse incident light to uniformly transmit the light upward. A distance between the reflection pattern 160 and the light emitting device 120 may be reduced in a direction in which the reflection pattern is away from the light emitting device 120. The reflection pattern 160 may be formed by printing reflection ink including one of $TiO_2$, $CaCo_3$, $BaSO_4$, $Al_2O_3$, silicon, and PS on a surface of the reflection member 150, but is not limited thereto.

Referring again to FIGS. 10 and 11, the bracket 500 may have a shape corresponding to that of the lighting module 10. When the lighting module 100 is bent, the bracket 500 may have a shape corresponding to the bent shape of the lighting module 100. The bracket 500 may be formed of a plastic material. A receiving groove receiving the lighting module 100 may be formed to an upper portion of the bracket 500. In an embodiment, the bracket 500 may have a rectangular box shape with an upper portion opened.

A coupling hole 520 may be formed to one side of the bracket 500 so that a coupling part 101 disposed on one side of the lighting module 100 is inserted into the coupling hole 520. The coupling hole 520 may be disposed on an edge region of a lower portion of one side of the bracket 500. The coupling hole 520 may have a shape corresponding to that of the coupling part 101 of the lighting module 100. A hook protrusion 510 for fixing the other side of the lighting module 100 may be disposed on the other side of the bracket 500. The hook protrusion 510 may be disposed on an upper portion of the other side of the bracket 500. The hook protrusions 510 may be disposed to be spaced apart from each other in a width direction of the bracket 500. The hook protrusion 510 may be disposed to cover a portion of an upper portion of the lighting module 100.

Since the lighting module 100 has a flexible property, the coupling part 101 may be slidably inserted into one side of the lighting module 100, and then, the other side of the lighting module 100 may be disposed on the lower portion the hook protrusion 510 to fix the lighting module 100 to the bracket 500.

A connector 400 may be disposed on the lower portion of the lighting module 100. The connector 400 may supply power from an external power source to the light emitting device 120 of the lighting module 100. The bracket 500 may include a recess 530 vertically passing through a predetermined region of the connector 400.

The connector 400 may be inserted to be coupled to the external power source (not shown). The connector 400 may undergo a vertical pressure while being inserted into the external power source, and thus, the lighting module 100 connected to the connector 400 may be separated from the bracket 500.

As illustrated in FIG. 12, a hook part 410 may be disposed on one side of the connector 400 to prevent the lighting module 100 from being separated from the bracket 500.

The hook part 410 may protrude from the connector 400 in a first direction in which the lighting module 100 is slid. A height D between the lower portion of the lighting module 100 and the hook part 410 may correspond to a thickness of the bracket 500. Thus, the hook part 410 may be disposed to cover a portion of a side surface of the bracket 500 having the recess 530.

The hook part 410 may have a length corresponding to that of the coupling part 101 disposed on the one side of the lighting module 100. Thus, while the coupling part 101 of the lighting module 100 is inserted into the coupling hole 510 of the bracket 500, the hook part 410 may be effectively coupled to the bracket 500.

The hook part 410 may be formed of the same material as the connector 400. On the other hand, the hook part 410 may be formed of a material having tension.

Although the hook part 410 is directly disposed in the first direction in which the lighting module 100 is slidably coupled to the bracket 500, the hook part 410 may be coupled to the bracket 500 in a 1' shape on both side surfaces of the connector 400 in a direction perpendicular to the first direction.

When the lighting module 100 is disposed on the bracket 500, the lighting module 100 is settled on the bracket 500 so that the connector 400 passes through the recess 530 formed to the bracket 500. The lighting module 100 may be slid in the first direction, and the hook part 410 disposed on the connector 400 may move to surround a bottom surface of the bracket 500 to effectively fix the lighting module 100 to the bracket 500. Simultaneously, the coupling part 101 disposed on the one side of the lighting module 100 is inserted to be coupled to the coupling hole 520 formed to the bracket 500.

When the one side of the lighting module 100 is coupled, the lighting module may push the other side of the lighting module 100 into the lower portion of the hook protrusion 510 disposed on the other side of the bracket 500 to effectively fix the lighting module 100 to the bracket 500.

In the lighting device according to the second embodiment, the hook part is disposed on the one side of the connector to effectively prevent the lighting module from being separated from the bracket when the connector is coupled to the external power source.

FIGS. 14 to 17 are views illustrating a modified example of the lighting device according to the second embodiment.

Figure 14:
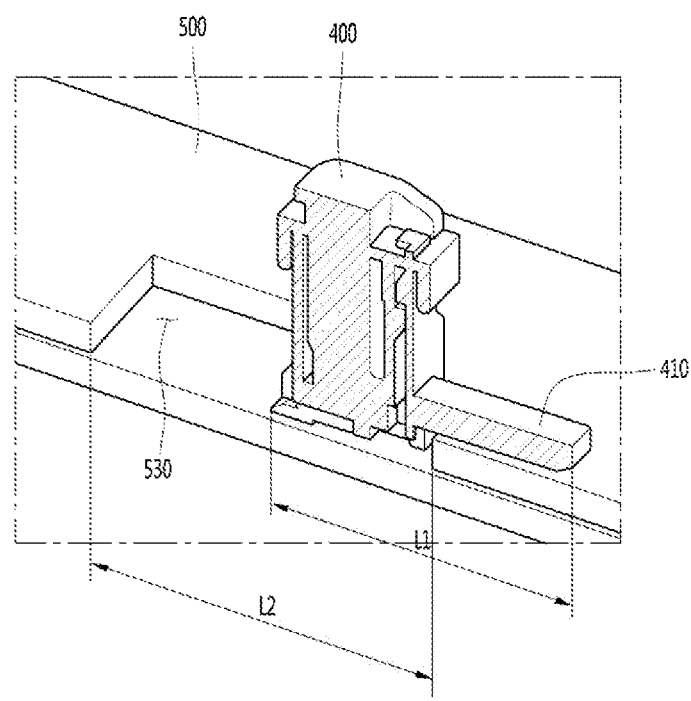
FIGS. 14 to 17 are views illustrating a modified example of the lighting device according to the second embodiment.

Referring to FIG. 14, the lighting device may further include a lighting module on which a connector 400 is disposed on a lower portion thereof and a bracket 500 receiving the lighting module 100 and having a recess 530 so that the connector 400 passes through the recess 530. Here, the lighting device is the same as the lighting device according to the second embodiment except for a structure of a hook part disposed on a connector 400, and thus, its detailed description will be omitted.

The hook part 410 may be disposed on one side of the connector 400. The hook part 410 may protrude from the connector 400 in a first direction in which the lighting module 100 is slid. A height D between the lower portion of the lighting module 100 and the hook part 410 may correspond to a thickness of the bracket 500. Thus, the hook part 410 may be disposed to cover a portion of a side surface of the bracket 500 having the recess 530.

The sum of lengths of the hook part 410 and the connector 400 may correspond to a length L2 of the recess 530 formed to the bracket 500. The length L2 of the recess 530 may have a length that is enough to allow the hook part 410 and the connector 400 to pass through the bracket 500. The hook part 410 may have tension. The hook part 410 may prevent the hook part 410 from being bent or prevent the connector 400 from being separated from the lighting module 100 while the lighting module 100 is coupled to the bracket 500.

When the lighting module 100 is disposed on the bracket 500, the lighting module 100 may move so that the connector 400 passes through the recess 530 formed to the bracket 500. Then, in a state in which the hook part 410 is inserted into the bracket 500, the lighting module 100 may be slid in the first direction. Here, since the hook part 410 has the tension, damage of the lighting module 100 and separation of the connector 400 may be prevented while the lighting module 100 is slid.

When the lighting module 100 is slid in the first direction so as to be inserted into the coupling hole 520 of the bracket 500, the hook part 410 may be coupled to the bracket 500 to fix the lighting module 100 to the bracket 500.

Since the lighting device includes the hook part having a predetermined length or more and also having the tension, the lighting module may be more stably coupled to the bracket.

Figure 15:
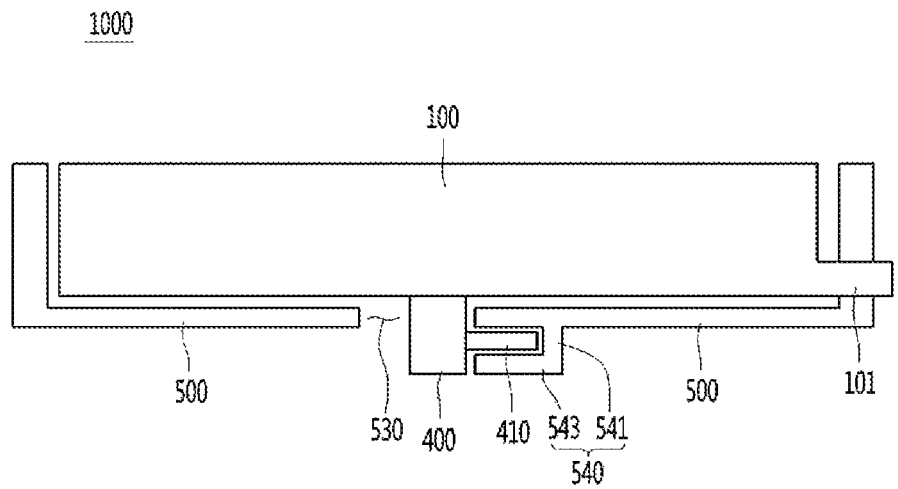

Referring to FIG. 15, the lighting device may further include a lighting module on which a connector 400 is disposed on a lower portion thereof and a bracket 500 receiving the lighting module 100 and having a recess 530 so that the connector 400 passes through the recess 530. The lighting device is the same as the lighting device according to the second embodiment except for a structure of a bracket 500, and thus, its detailed description will be omitted.

The bracket 500 may have a rectangular box shape with an upper portion opened. The lighting module 100 may be coupled to the upper portion of the bracket 500. A coupling hole 520 may be formed to one side of the bracket 500 so that a coupling part 101 of the lighting module 100 is coupled to the coupling hole 520. Hook protrusions 510 spaced apart from each other in a width direction to cover a portion of the upper portion of the lighting module 100 may be disposed on the other side of the bracket 500.

A recess 530 through which the connector 400 passes may be formed to a lower portion of the bracket 500. A receiving part 540 may be further provided in the lower portion of the bracket at one side of the recess 530. The receiving part 540 may surround the hook part 410 disposed on one side of the connector 400. The receiving part 540 may include a first support part 541 protruding to a lower side of the bracket 500 and a second support part 543 disposed from the first support part 541 toward the connector 400. The first support part 541 may be disposed to surround a side surface of the hook part 410. The second support part 543 may be disposed to surround a lower portion of the hook part 410.

The lighting device may further include the receiving part 540 receiving the hook part to more stably fix the lighting module to the bracket. Also, the receiving part may prevent the hook part from moving in the direction of the side surfaces to stably align the lighting module to the bracket.

Figure 16:
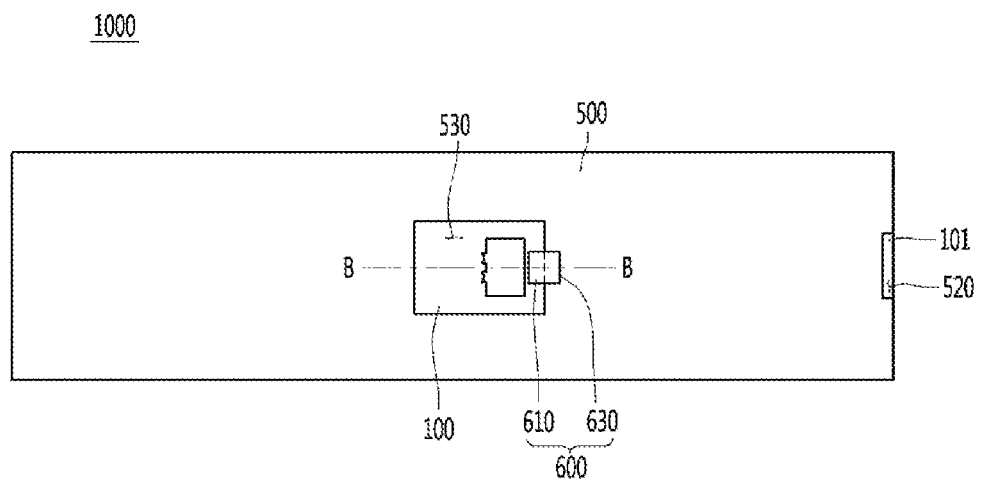
Figure 17:
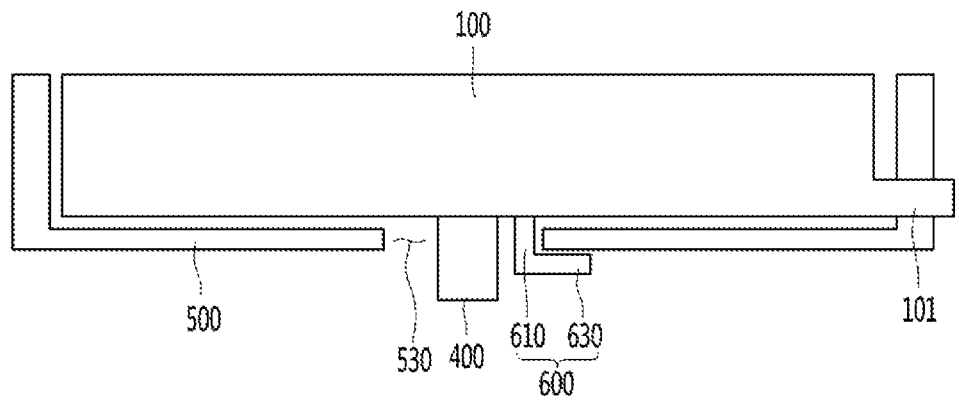

Referring to FIGS. 16 and 17, the lighting device 1000 may include a lighting module 100 on which a connector 400 is disposed on a lower portion thereof, a bracket 500 receiving the lighting module 100 and having a recess 530 so that the connector 400 passes, and a hook part 600 spaced apart from the connector 400 and coupled to one side of the bracket 500. Here, the lighting device is the same as the lighting device according to the second embodiment except for a structure of a hook part 600, and thus, its detailed description will be omitted.

The hook part 600 may be disposed on a lower portion of the lighting module 100. The hook part 600 may be spaced apart from the connector 400. The hook part 600 may be spaced apart from the connector 400 in a first direction in which the lighting module 100 is slid.

The hook part 600 may include a vertical part 610 protruding to a lower side of the lighting module 100 and a horizontal part 630 protruding from the vertical part 610 in a direction opposite to the connector 400. The vertical part 610 may support a side surface of the bracket 500 having the recess 530. The horizontal part 630 may be disposed to surround a portion of a lower portion of the bracket 500 having the recess 530.

In the lighting device, the hook part may be separately provided with respect to the connector to reduce a pressure applied to the connector while the lighting module is coupled to the bracket.

Figure 18:
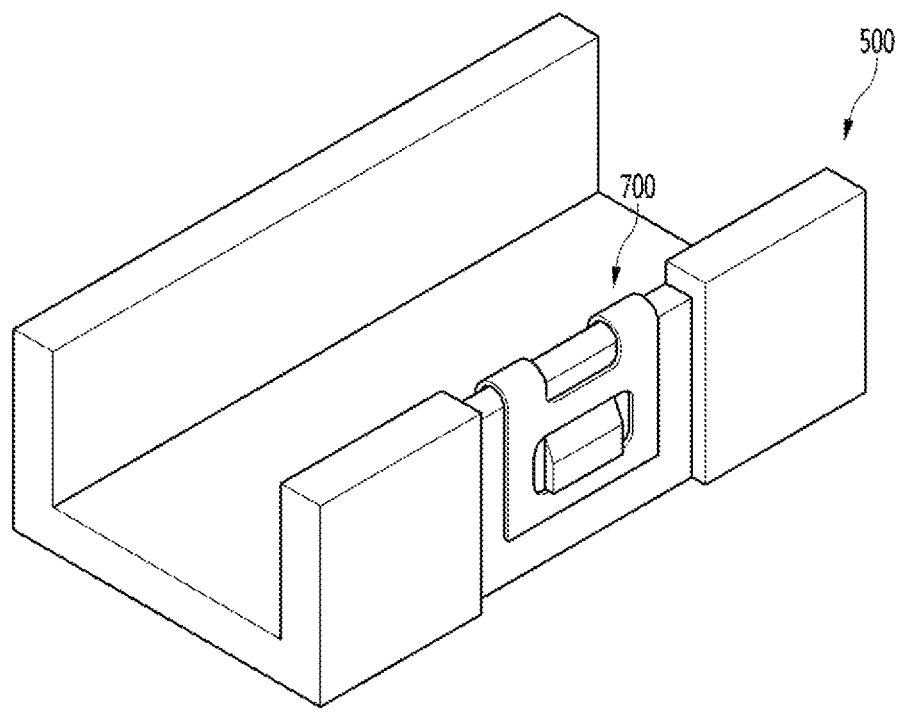
FIG. 18 is a perspective view of a lighting module coupling device according to a third embodiment.
Figure 19:
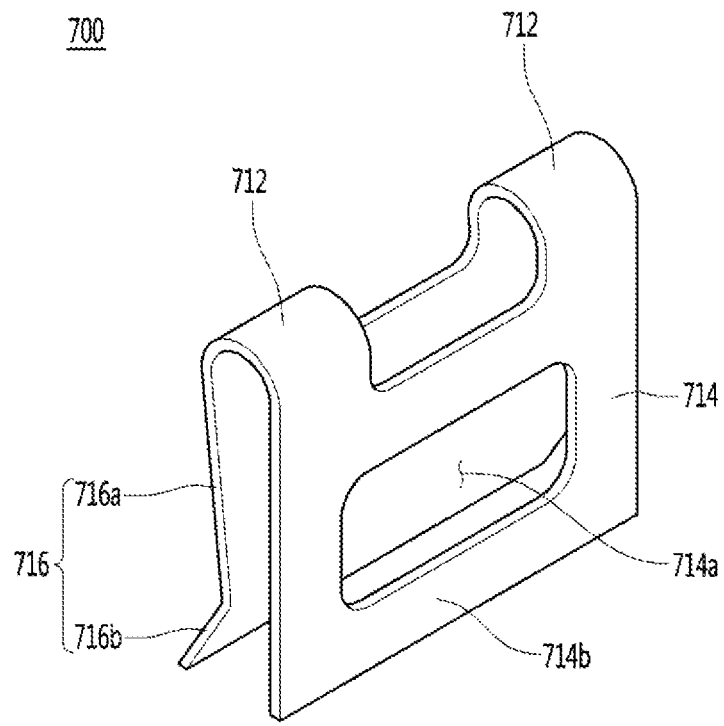
FIG. 19 is a view of a fixing member that is a component of FIG. 18.
Figure 20:
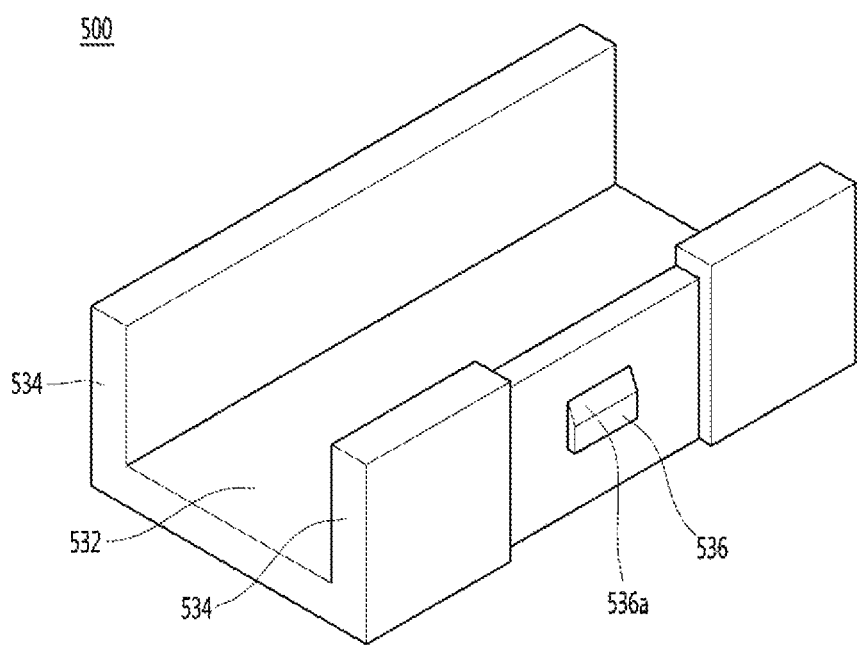
FIG. 20 is a view of a bracket that is a component of FIG. 18.
Figure 21:
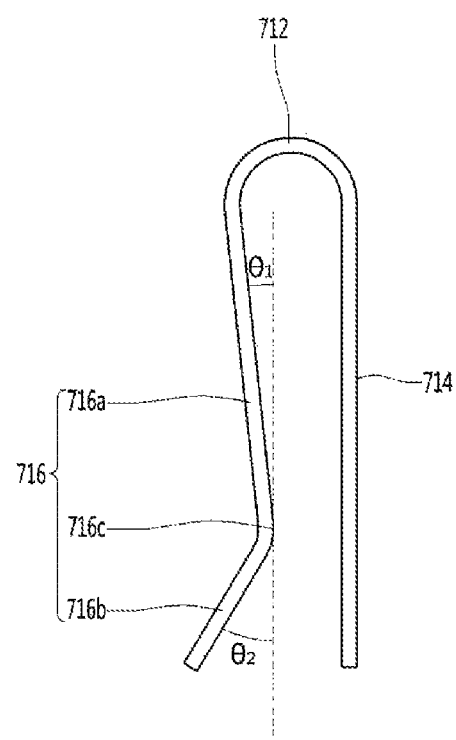
FIG. 21 is a side view of FIG. 19.

FIG. 18 is a perspective view of a lighting module coupling device according to a third embodiment, FIG. 19 is a view of a fixing member that is a component of FIG. 18, FIG. 20 is a view of a bracket that is a component of FIG. 18, and FIG. 21 is a side view of FIG. 19.

Referring to FIGS. 18 to 21, a lighting module coupling device according to a third embodiment may include a bracket 500 receiving a lighting module and a fixing member 700 fixing the lighting module.

The bracket 500 may include a base plate 532 and a pair of sidewalls 534. The base plate 532 may have a flat plate shape, and the lighting module may be settled on the base plate 532. The base plate 532 may have various shapes according to a shape of the lighting module settled on the base plate 532.

The sidewalls 534 may be provided in a pair so as to be respectively connected to both sides of the base plate 532. A hook part 536 may be disposed on an outer surface of at least one sidewall 534. Each of the sidewalls 534 may be connected to the base plate 532 to define a space in which the lighting module is received. The sidewall 534 may be connected to be approximately perpendicular to a side surface of the base plate 532, thereby stably supporting the lighting module.

At least one hook part 536 may be disposed on an outer surface of the sidewall 534. The hook part 536 may be coupled to a fixing part 714 of the fixing member 700 to prevent the fixing member 700 from moving.

Referring to FIG. 20, the hook part 36 protrudes from an outer surface of the sidewall 534 to fix the fixing member 700. According to an embodiment, the hook part 536 may be inclined in a direction into which the fixing member 700 is inserted. This may allow the fixing member 700 to be coupled to the hook part 536 over the inclination so as to facilitate the coupling.

A region of the sidewall 534 into which the fixing member 700 is inserted may have a relatively narrow width and low height when compared to that into which the fixing member 700 is not inserted. This is done for preventing the fixing member from interfering with other structures when the fixing member 700 is inserted.

The fixing member 700 may include a bending part 712, and a fixing part 714 and a support part 716 which are respectively connected to both sides of the bending part 712. The fixing member 700 may be provided in a shape in which a plate-shaped metal structure having elasticity is bent, and the fixing part 714 and the support part 716 may be connected to the bending part 712 and then inserted into the sidewall 534. As illustrated in FIG. 19, a boundary between the bending part 712 and the fixing part 714 and a boundary between the bending part 712 and the support part 716 may be unclear. However, this is arbitrarily divided to describe the member and is not limited the name.

The bending part 712 may have a curved surface. A slimming structure for reducing manufacturing cost may be applied to the bending part 712, and an opening part may be provided in the bending part 712.

The fixing part 714 contacts an outer surface of the sidewall 534, and a coupling groove 714a may be formed to one region of the fixing part so as to be coupled to the hook part 536 of the sidewall 534. The coupling groove 714a may pass through the inclination formed on the hook part 356 and then be fixed to a stepped portion of the hook part 536 to prevent the fixing part 714 from being separated.

The support part 716 may have a contact surface contacting an inner surface of the sidewall 534, and a bent portion may be formed on the support part 716.

A minimum distance between the innermost point 716c and an inner surface of the fixing part 714 may be less than a width of the sidewall 534. Thus, when the fixing member 700 is inserted, the fixing member may be pressed toward the inside of the sidewall to prevent the fixing member 700 from being separated.

The bent portion may be divided into a first section 716a and a second section 716b. Here, the first section 716a may be longer than the second section 716b. An inclined angle θ1 defined by the first section 716a with respect to a line contacting the innermost point 716c of the bent portion may be less than an inclined angle θ2 defined by the second section 716b.

In an embodiment, the inclined angle θ1 defined by the first section 716a may be 6 degrees to 8 degrees, and the inclined angle θ2 defined by the second section 716b may be 28 degrees to 32 degrees.

When the lighting module is inserted into the bracket 500, the second section 716b may support the lighting module. In order to stably support the lighting module, it is advantageous when the supporting point of the second section 716b is away from the sidewall 534. However, in this case, the second section 716n may block light emitted from the light source to deteriorate light efficiency. Also, when the inclined angle θ2 of the second section 716 is reduced for the light efficiency, stability of the coupling may be deteriorated.

Thus, the length of the first section 716 may be provided longer than the second section 716b, and the inclined angle θ2 of the second section 716b may be provided longer than the inclined angle θ1 of the first section 716a to secure supporting force and also improve the light efficiency.

Figure 22:
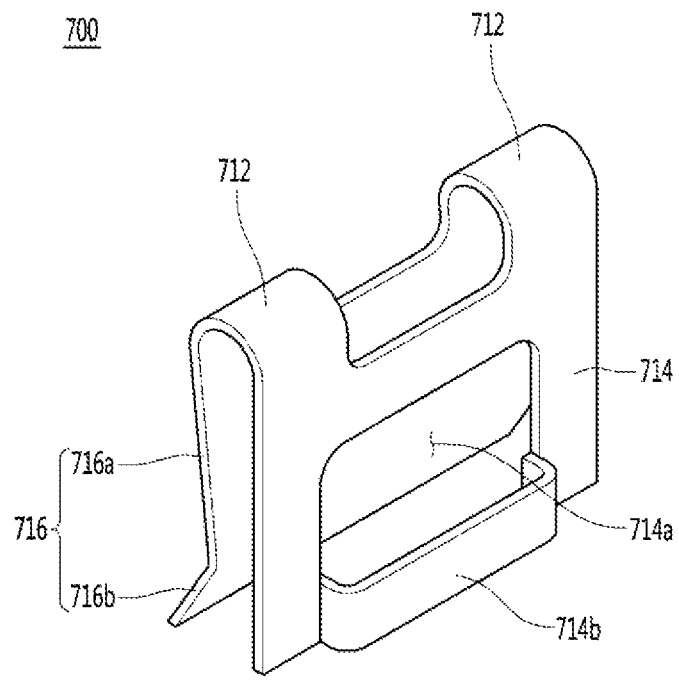
FIGS. 22 and 23 are views illustrating a modified example of a fixing member that is a component of FIG. 18.
Figure 23:
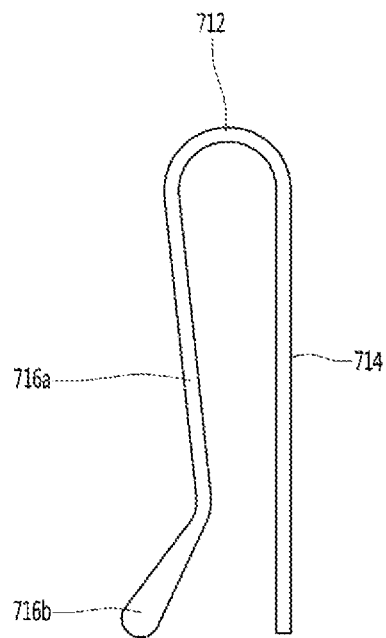

FIGS. 22 and 23 are views illustrating a modified example of the fixing member that is a component of the lighting module coupling device according to an embodiment of the present invention.

Although fixing force of the fixing member 700 with respect to the bracket 500 may be important, a decomposition may be required when the lighting module disposed in an inner space of the bracket 500 needs to be repaired, or a defect of the lighting module occur. However, when the fixing member 700 completely adheres to an outer surface of the sidewall 534, it is difficult to separate the fixing member 700 from the hook part 536. To solve this problem, a bottom surface 714b of the fixing part 714 may be spaced a predetermined space from the sidewall 534.

Referring to FIG. 22, a spaced section may be formed between the bottom surface 714b of the fixing part 714 and the sidewall 534.

The spaced space formed to the bottom surface 714b of the fixing part 714 may serve as a handle when the fixing member 700 is disassembled. In an embodiment, the bottom surface 714b of the fixing part 714 may have a curved shape to form a spaced space between the sidewall 534 and the bottom surface 714b. Although the entire bottom surface 714b is provided in the curved surface to form the spaced space, this is merely an example. For example, the bottom surface 714b may have various shapes to form the spaced space.

FIGS. 22 and 23 are views illustrating another modified example of the fixing member that is a component of the lighting module coupling device according to an embodiment of the present invention.

Referring to FIG. 23, an end of the support part 716 may have a curved shape. In general, the lighting module may be formed of a transparent material through which light is transmitted. Here, when scratches occur on the surface of the lighting module by the end of the support part 716, an optical path may be changed to cause a problem of light uniformity. To solve this problem, a cross-section of the support part 716, which contacts the lighting module, may be provided in a curved shape.

In an embodiment, the support part 716 may have a cross-section that gradually increases in width from the innermost point 714c of the second section 714b toward the end thereof, and a contact surface may be provided in a curved shape.

This is merely an example. For example, the second section 714b may be curved and also variously modified in shape so that the contact surface with the lighting module has a curved shape.

Hereinafter, a lighting device according to further another embodiment of the present invention will be described as follows. However, the description of the same components as those of the lighting module coupling device according to an embodiment of the present invention will be omitted.

Figure 24:
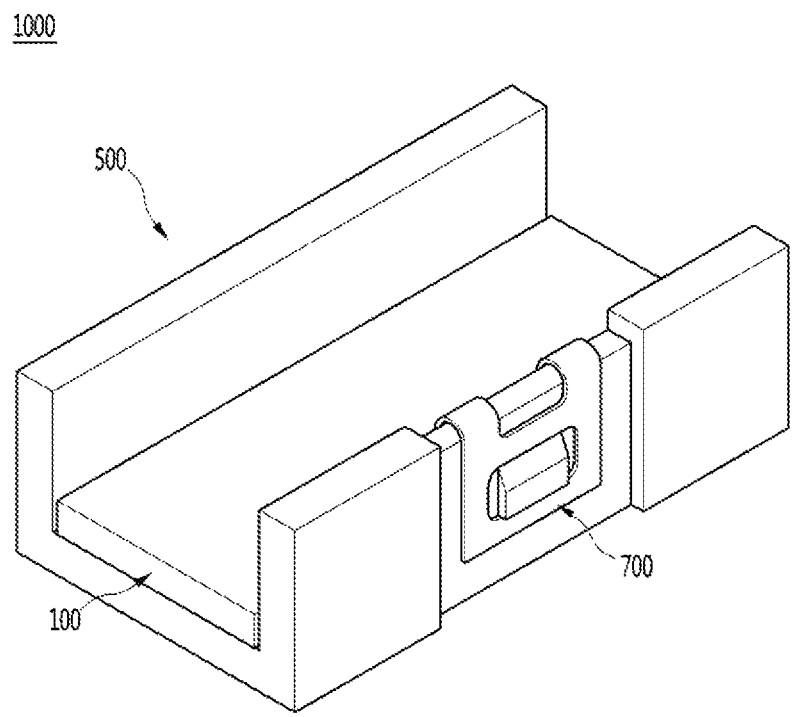
FIG. 24 is a view illustrating a lighting device including the lighting module coupling device according to the third embodiment.
Figure 25:
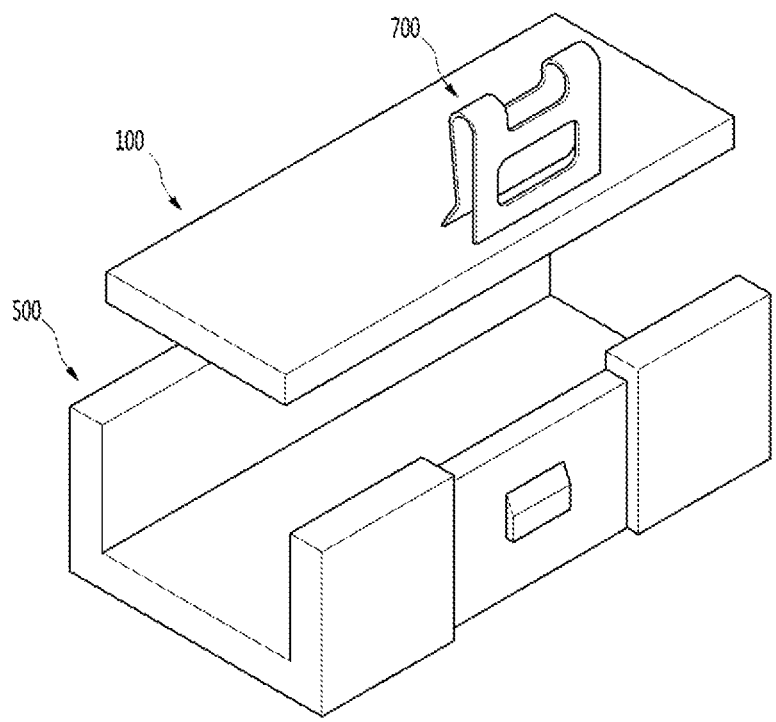
FIG. 25 is an exploded perspective view of FIG. 24.
Figure 26:
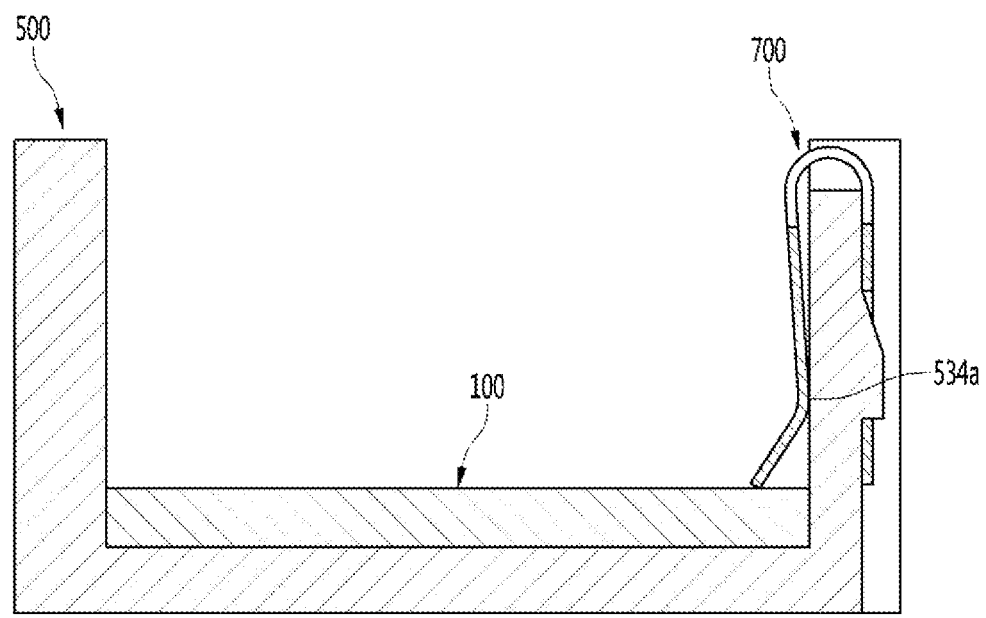
FIG. 26 is a cross-sectional view of FIG. 24.

In FIGS. 24 to 26, the same reference numerals as those in FIGS. 18 to 23 denote the same members, and a detailed description thereof will be omitted.

FIG. 24 is a view illustrating a lighting device according to further another embodiment, FIG. 25 is an exploded perspective view of the lighting device, and FIG. 26 is a cross-sectional view of the lighting device.

Referring to FIGS. 24 to 26, a lighting device 1000 according to further another embodiment of the present invention may include a lighting module 100 and the above-described lighting module coupling device.

The lighting module coupling device may include a bracket 500 receiving the lighting module 100 and a fixing member 700 fixing the lighting module 100.

The fixing member 700 may be manufactured according to the foregoing various embodiments. The bracket 500 receives and supports the lighting module 100. The bracket 500 may be formed of a metallic material such as plate-shaped stainless steel or a special alloy having tensile force, or a plastic composite material. The bracket 500 may be changed in thickness according an installed position, required elasticity, and a material thereof.

The lighting module 100 may be implemented with any lighting module that is capable of being fixed by the lighting module coupling device. Particularly, the lighting module 100 may be implemented as a flexible lighting module or a lighting module using linear fluorescent light having a stereoscopic effect.

Referring to FIG. 25, in the lighting device 1000, the lighting module 100 is inserted into an inner space defined by the bracket 500, and then, the fixing member 700 is inserted to couple the lighting module.

The fixing member 700 is disposed at one side in FIGS. 24 and 25, but is not limited thereto. For example, the fixing member 700 may be disposed on each of both sides of the sidewall 534 and also be provided in plurality according to a length of the sidewall 534.

Referring to FIG. 26, in the lighting device 1000, the fixing part 714 is fixed to the hook part 714, and the second section 716b of the support part 716 supports the lighting module 100. Here, a receiving groove 534a receiving one region of the support part 716 may be formed to the sidewall 534. The receiving groove 534a may be disposed in the vicinity of the innermost point 716c of the support part 716 to enhance the fixing force of the fixing member 700.

Also, a reflective material for reflecting lateral light emitted toward a side surface may be applied to an inner surface of the bracket 500 into which the lighting module 100 is inserted. The reflective material may be applied to the inner surface of the bracket 500 to improve light efficiency of light emitted from the light source.

A metal such as aluminum having high reflectance as the reflective material may be deposited, or white paint having light reflectance may be used as the reflective material.

As described above, the lighting device 1000 may be used for domestic lighting devices, industrial lighting devices, vehicle lamps, and the like. In the case of the vehicle lamps, the vehicle lamps may be applied to tail lamps, stop lamps, turn signal lamps, or rear combination lamps constituted by a combination of thereof. In addition, in the case of the vehicle lamps, the vehicle lamps may be applied to headlights, interior lights for vehicles, door scarves, and the like.

Features, structures, and effects described in the above embodiments are incorporated into at least one embodiment, but are not limited to only one embodiment. Moreover, features, structures, and effects exemplified in one embodiment can easily be combined and modified for another embodiment by those skilled in the art. Therefore, these combinations and modifications should be construed as falling within the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A lighting device comprising:
a flexible lighting module provided with a light emitting device;
a coupling member disposed on a lower portion of the lighting module; and
a bracket having a receiving groove for receiving the lighting module and a coupling hole into which the coupling member is inserted and coupled,
wherein the coupling member comprises a body part disposed on the lower portion of the lighting module, a protrusion part protruding to a lower portion of the body part, and first and second hook parts bent upward from an end of the protrusion part to face each other, and
wherein the first and second hook parts support a lower portion of the bracket.

2. The lighting device according to claim 1, further comprising a first support part protruding upward from the first hook part and a second support part protruding upward from the second hook part,
wherein the first support part and the second support part support a side surface of the bracket.

3. The lighting device according to claim 2, further comprising a first horizontal part protruding from the first support part toward the outside of the protrusion part and a second horizontal part protruding from the second support part toward the outside of the protrusion part,
wherein the first horizontal part and the second horizontal part support a portion of an upper portion of the bracket.

4. The lighting device according to claim 1, wherein the protrusion part comprises a first protrusion part and a second protrusion part, which protrude downward from the body part and are spaced apart from each other, and
the first hook part extends from the first protrusion part, and the second hook part extends from the second protrusion part.

5. The lighting device according to claim 1, wherein the bracket includes a settling groove on which the body part is settled, and
the settling groove supports a side surface and a portion of a lower portion of the body part.

6. The lighting device according to claim 1, wherein the coupling member is disposed on the lower portion of the lighting module corresponding to the light emitting device and made of a metal material.

7. The lighting device according to claim 1, wherein a portion of the lighting module is bent in up, down, left and right directions.

8. The lighting device according to claim 1, wherein the lighting module comprises a substrate on which the light emitting device is mounted, a light guide member surrounding the light emitting device, a first optical member disposed on an upper portion of the light guide member, and a second optical member disposed to be spaced apart from an upper portion of the first optical member.

9. The lighting device according to claim 8, wherein the lighting module comprises a reflection member disposed on the substrate except for a region on which the light emitting device is disposed.

10. The lighting device according to claim 9, further comprising a reflection pattern disposed on the reflection member.

11. A lighting device comprising:
a lighting module provided with a light emitting device;
a connector disposed on a lower portion of the lighting module and connected to an external power source to supply power to the light emitting device; and
a bracket comprising a recess which accommodates the lighting module and through which the connector passes,
wherein the lighting module is slid in a first direction and is coupled to the bracket, and a hook part protruding in the first direction is disposed on one side of the connector.

12. The lighting device according to claim 11, wherein one side of the bracket is disposed between the hook part and the lighting module.

13. The lighting device according to claim 11, wherein the lighting module is slid in a state in which one side of the bracket is inserted therein, and the hook part has tension.

14. The lighting device according to claim 13, wherein a sum of lengths of the hook part and the connector corresponds to a length of the recess defined in the bracket.

15. The lighting device according to claim 11, wherein the bracket further comprises a receiving part for receiving the hook part, and
wherein the receiving part comprises a first support part surrounding a side surface of the hook part and a second support part surrounding a lower portion of the hook part.

16. The lighting device according to claim 11, wherein a coupling hole is further formed in one side of the bracket, and
a coupling part which is inserted into and coupled to the coupling hole formed in the bracket is further disposed on one side of the lighting module.

17. A lighting device comprising:
a lighting module provided with a light emitting device;
a connector disposed on a lower portion of the lighting module and connected to an external power source configured to supply power to the light emitting device; and
a bracket comprising a recess which receives the lighting module and through which the connector passes,
wherein the lighting module is slid in a first direction and is coupled to the bracket, and hook parts spaced apart from each other in the first direction and coupled to one side of the bracket are disposed on one side of the connector.

18. The lighting device according to claim 17, wherein the hook parts comprise a vertical part protruding downward from the lighting module and a horizontal part extending from one side of the vertical part to surround a lower portion of the bracket.

19. The lighting device according to claim 18, further comprising hook protrusions spaced apart from each other in a width direction to surround an upper portion of the lighting module which are further disposed on the other side of the bracket.

* * * * *